March 23, 1937.  W. NOBLE  2,074,802
HEAT EXCHANGE DEVICE
Filed June 18, 1934
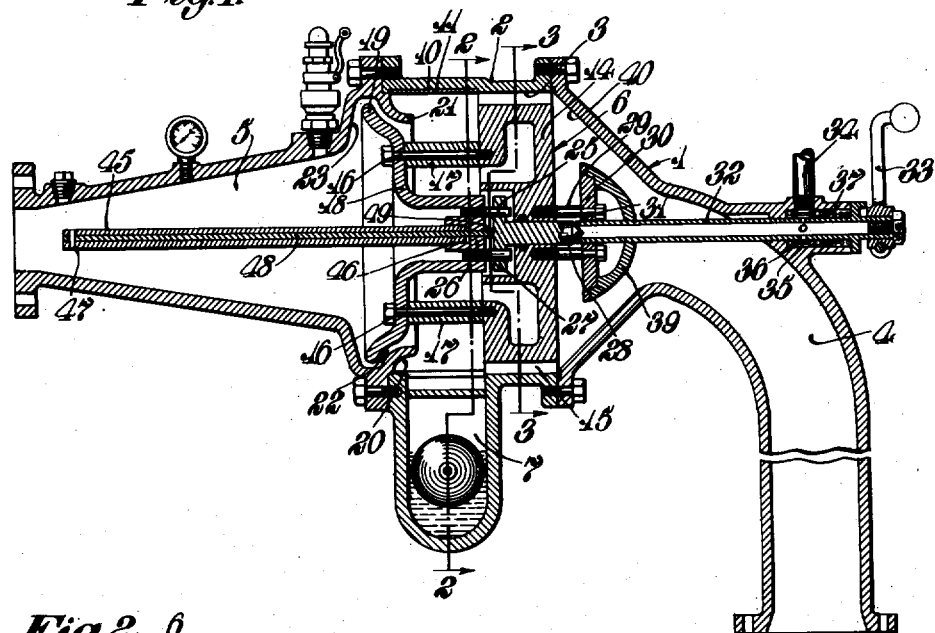
Inventor:
Warren Noble.
by Luis A. Maxom.
Atty.

Patented Mar. 23, 1937

2,074,802

UNITED STATES PATENT OFFICE 2,074,802

HEAT EXCHANGE DEVICE

Warren Noble, Michigan City, Ind., assignor to Sullivan Machinery Company, a corporation of Massachusetts Application June 18, 1934, Serial No. 731,084

18 Claims. (Cl. 261—118)

This invention relates to heat exchange devices, and more particularly, but not exclusively, to improvements in the separator means of a heat exchange device of the type wherein the fluid to be cooled is commingled with the cooling liquid and the cooled fluid thereafter separated from the liquid.

An object of this invention is to provide an improved heat exchange device. Another object is to provide an improved separator means for a heat exchange device for separating the cooled fluid from the cooling liquid. Another object is to provide an improved separator means for a heat exchange device of the type wherein the fluid to be cooled is commingled with the cooling liquid and thereafter the cooling liquid is separated from the cooled fluid. Yet another object is to provide in a heat exchange device of the above character an improved fluid and liquid separator means whereby the fluid and liquid are separated in an improved manner by a centrifugal whirling action. Still another object is to provide an improved separator means having improved means for imparting a centrifugal whirling motion to the fluid and cooling liquid as the same pass through the heat exchange device, thereby to attain an effective separating action thereon. These and other objects of the invention will, however, hereinafter more fully appear.

In the accompanying drawing there is shown for purposes of illustration one form which the invention may assume in practice.

In this drawing:—

Fig. 1 is a central, longitudinally extending, vertical sectional view taken through a heat exchange device having embodied therein the illustrative form of the improved separator means.

Fig. 2 is a transverse vertical sectional view taken on line 2—2 of Fig. 1.

Fig. 3 is a transverse vertical sectional view taken on line 3—3 of Fig. 1.

Fig. 4 is an elevational view of an element of the separator means.

In this illustrative embodiment of the invention there is shown a heat exchange device, generally designated 1, of the type wherein the fluid to be cooled is commingled with the cooling liquid in the manner of a fog or mist and thereafter separated from the cooling liquid by a centrifugal whirling action as the fluid and liquid pass through the heat exchange device. This heat exchange device may be of the same general character as that disclosed in my copending application, Ser. No. 713,333, filed Feb. 28, 1934; the improvement herein, in the main, residing in the separator means for separating the cooling liquid from the fluid after the latter is cooled.

In this illustrative construction, the heat exchange device comprises a casing 2 having a cylindrical chamber 3 with which communicates an inlet passage 4 for the fluid to be cooled, herein air under pressure; and also communicating with this chamber is a fluid discharge passage 5 through which the cooled fluid is discharged from the heat exchange device. Arranged in the chamber 3 is the improved separator means, generally designated 6, for separating the cooling liquid from the cooled fluid, and communicating with the chamber 3 at the bottom of the separator means for receiving the liquid separated from the cooled fluid is a liquid drain chamber 7. A float controlled drain valve 8 is provided for regulating the flow of liquid from the drain chamber 7 through a liquid discharge pipe 9 thereby to maintain the liquid in the chamber below a predetermined level. The chamber 3 is annularly recessed at 10 to receive a non-corrosive liner 11, preferably of stainless steel, providing an extremely smooth inner surface water race for receiving the cooling liquid as the commingled fluid and liquid are discharged into the chamber 3 with a centrifugal whirling motion, and one end of this liner is bent downwardly to form a bottom discharge opening 12 which communicates with a drain passage 13 through which the liquid is drained from the chamber 3 to the drain chamber 7.

Now referring to the improved separator means 6, it will be noted that arranged in the chamber 3 is a cylindrical separator member 14 having formed on its exterior periphery a series of spirally curved passages 15 whose flow directing surfaces curve forwardly as well as circumferentially of the casing and which herein discharge substantially helically and each of which has its exit spaced axially of the chamber from its inlet, so that their exits are in a different transverse zone from their inlets, and which have relatively large surface areas as compared with their flow areas; and the curve of these passages is so designed as to maintain maximum acceleration of the commingled fluid and liquid as the same flow therethrough. Through these curved passages the mingled fluid and liquid pass with a whirling motion in a direction longitudinally of the chamber 3, which effects an efficient separation on the centrifugal principle, a separation which is completed in the portion of the chamber in which the smooth water race liner 11 is arranged. Secured to the member 14 as by screws 16 and spaced therefrom by spacer sleeves 17 is a plate 18 having an annular flange 19, while formed on the inner wall of the casing 2 is a deflecting surface 20, and the fluid and liquid discharging into the chamber 3 from the curved passages 15 in a direction longitudinally of the chamber impinge on the deflecting surface 20, and the liquid separated from the fluid flows down around the surface 20 through the drain passage 13 to the liquid drain chamber 7, while the cooled fluid flows past an annular liquid retaining and flow forming lip 21 at the inner edge of the deflecting surface 20 and through a curved passage 22 exteriorly of the flange 19 and around the periphery of this flange along a curved surface 23 to the discharge passage 5. In this instance, secured by rods 25 threadedly connected to the hub 26 of the plate 18 is a disc-like plate 27 having formed thereon a controlling valve or plug 28. Also secured by screws 29 to the cylindrical separator member 14 is a plate 30 having adjustably secured thereto as by threads 31 a cooling liquid supply pipe 32. This supply pipe has secured thereto at its outer extremity a handle 33 whereby the pipe may be rotated and thereby, due to its threaded connection with the plate 30, moved axially with respect to the controlling valve or plug 28, which, when the parts are in the position shown in Fig. 1, maintains the inner end of the liquid supply pipe closed. By moving the pipe 32 axially in and out with respect to the valve 28, the flow of cooling liquid through the pipe 32 may be manually regulated as desired. The cooling liquid supply pipe communicates with a pipe 34 leading to any suitable source of supply of cooling liquid, herein preferably water under pressure. The liquid supply pipe 32 communicates with the pipe 34 through a packing ring 35 and packing collars 36, 36 held in sealing engagement by a coil spring 37 so that a fluid tight seal is maintained between the pipes 32 and 34 irrespective of the adjusted position of the pipe 32. Suitably secured to the plate 30 is an air flow deflector member 39, so that the flow of fluid from the passage 4 is directed outwardly along the inclined wall 40 of the casing 2 toward the outer surface periphery of the cylindrical separator member 14, and when the pipe 32 is moved axially to open the inner end thereof with respect to the valve 28, cooling liquid flows through the pipe 32 and, as it is discharged from the latter it impinges against the flat outer surface of the member 14 and is deflected laterally in the manner of a spray across the stream of fluid flowing past the deflector 39, the cooling liquid commingling with and traversed by the fluid, cooling the latter, and the commingled liquid and fluid flowing in the form of a mist or fog through the curved passages 15 formed on the exterior periphery of the cylindrical member 14, causing the commingled liquid and fluid to be whirled rapidly about the interior wall of the chamber 3 in a direction longitudinally of the latter, thereby effecting separation of the cooled fluid from the cooling liquid. The separated cooling liquid impinges against the deflecting surface 20 and is drained into the liquid drain chamber 7, while the cooled fluid flows past the deflecting lip 21, through the curved passages 22, 23, and about the peripheral edge of the flange 19 to the discharge opening 5 through which the cooled fluid is discharged from the heat exchange device.

If it is desired to attain a more effective centrifugal whirling action of the commingled fluid and liquid, the cylindrical separator member 14 may be formed substantially wider than is shown, thereby to increase the length of the curved flow passages 15. It will be further evident that the deflecting surface 20, lip 21, flange 19 and curved passages 22 and 23 may be formed in various manners to attain the most effective separation of the fluid and liquid under varying conditions and, in a certain instance, the cooled fluid may be separated from the liquid by a series of baffles instead of the particular deflecting surfaces shown.

As disclosed in my copending application referred to above, means is provided for automatically controlling the regulating valve 28 for the cooling liquid flowing through the supply pipe 32 automatically in accordance with the temperature of the cooled fluid in the discharge passage 5 and herein comprises a thermostatic element 45 arranged centrally within the passage 5 and secured at 46 to the hub 26 of the plate 18. This thermostatic element is connected at 47 to a thermostat plunger rod 48 guided centrally within the thermostatic element and connected at 49 to the cooling liquid and regulating valve 28. The tube 45 and rod 48 are composed of elements having different coefficients of expansion, that of the tube being higher. It will thus be seen that if the temperature of the fluid in the discharge passage 5 becomes too high, the thermostat acts to move the regulating valve 28 away from the discharge end of the supply pipe 32, thereby to supply a larger quantity of cooling liquid to the fluid stream. If the temperature of the fluid in passage 5 becomes too low, the thermostatic element acts to move the regulating valve 28 toward the discharge end of the liquid supply pipe thereby to diminish or cut off the flow of cooling liquid to the fluid stream.

As a result of this invention, it will be noted that an improved heat exchange device is provided wherein the cooling liquid is commingled with the fluid to be cooled and thereafter separated from the cooled fluid in an improved and extremely effective manner. It will further be noted that an improved separator means is provided for the commingled fluid and liquid whereby the liquid is separated from the fluid by an improved centrifugal whirling action. These and other uses and advantages of the improved heat exchange device will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a heat exchange device, a casing having a cylindrical chamber through which a gaseous fluid to be cooled is adapted to flow, means in said casing for spraying cooling liquid into the path of the gaseous fluid stream for effecting intermingling of the cooling liquid with the gaseous fluid, means for thereafter separating the commingled gaseous fluid and liquid by imparting thereto a centrifugal whirling action rapidly to whirl the same about the interior periphery of said cylindrical chamber in a direction longitudinally of the casing comprising a cylindrical separator member stationary with respect to said casing and arranged in said chamber, said cylindrical separator member having formed on its exterior periphery a series of curved flow-directing passages for imparting a whirling motion to the commingled gaseous fluid and liquid, and means for respectively discharging the cooled gaseous fluid and separated liquid from said casing.

2. In a heat exchange device, a casing through which a gaseous fluid to be cooled is adapted to flow, said casing having a cylindrical portion, means in said casing for spraying a cooling liquid into the path of the gaseous fluid stream for effecting intermingling of the cooling liquid with the gaseous fluid, means stationary with respect to said casing and arranged within said cylindrical casing portion and providing flow-directing surfaces curving forwardly and circumferentially of said casing for thereafter separating the commingled gaseous fluid and liquid by imparting thereto a centrifugal whirling action rapidly to whirl the same completely about the interior periphery of said cylindrical casing portion in a direction longitudinally of the casing, means against which the whirling gaseous fluid and liquid impinge for effecting final separation of the liquid from the cooled gaseous fluid, and means for respectively discharging the cooled gaseous fluid and liquid from said casing.

3. In a heat exchange device, a casing having a cylindrical chamber through which a gaseous fluid to be cooled is adapted to flow, means in said casing for spraying cooling liquid into the path of gaseous fluid stream for effecting intermingling of the cooling liquid with the gaseous fluid, means for thereafter separating the commingled gaseous fluid and liquid by imparting thereto a centrifugal whirling action rapidly to whirl the same completely about the interior periphery of said cylindrical chamber in a direction longitudinally of the casing comprising a cylindrical separator member stationary with respect to said casing and arranged in said chamber, said cylindrical member having formed on its exterior periphery a series of curved flow-directing passages for imparting a whirling motion to the commingled gaseous fluid and liquid, means against which the whirling gaseous fluid and liquid impinge for effecting final separation of the liquid from the cooled gaseous fluid, and means for respectively discharging the cooled gaseous fluid and separated liquid from said casing.

4. In a heat exchange device, a casing through which an at-least-partially-gaseous fluid to be cooled is adapted to flow, means for spraying cooling liquid into the fluid stream including passages each discharging helically within said casing, and means for thereafter separating the commingled gaseous fluid and liquid by a centrifugal whirling action in a cylindrical zone in a direction longitudinally of the casing, and means against which the gaseous fluid and liquid impinge for effecting final separation of the liquid from the cooled gaseous fluid comprising cooperating curved deflecting and flow forming surfaces.

5. In a heat exchange device, a casing having a cylindrical chamber through which an at-least-partially-gaseous fluid to be cooled is adapted to flow, means for spraying cooling liquid into the fluid stream, means for thereafter separating the commingled gaseous fluid and liquid by a centrifugal whirling action in a direction longitudinally of the chamber comprising a cylindrical separator member arranged in said chamber and having formed on its exterior periphery a series of curved flow directing passages for imparting a cylindrically whirling motion to the commingled fluids, and means against which the gaseous fluid and liquid impinge for effecting final separation of the liquid from the cooled gaseous fluid comprising cooperating curved deflecting and flow forming surfaces.

6. In a heat exchange device, a casing having a cylindrical chamber through which an at-least-partially-gaseous fluid to be cooled is adapted to flow, a cylindrical separator member arranged in said chamber and having formed on its exterior periphery curved flow directing passages, means for discharging liquid against an end surface of said cylindrical member to form a spray traversed by the fluid stream, the commingled fluid and liquid flowing through said curved passages and the latter imparting to the gaseous fluid and liquid a centrifugal whirling motion in a direction longitudinally of said chamber to effect elimination of the liquid from the gaseous fluid.

7. In a heat exchange device, a casing having a cylindrical chamber through which an at-least-partially gaseous fluid to be cooled is adapted to flow, a cylindrical separator member arranged in said chamber and having formed on its exterior periphery curved flow directing passages whose direction has a maximum tangential component at their discharge ends, means for discharging liquid against an end surface of said cylindrical member to form a spray traversed by the fluid stream, the commingled fluid and liquid flowing through said curved passages and the latter imparting to the gaseous fluid and liquid a centrifugal whirling motion in a direction longitudinally of said chamber, and means for regulating the liquid spray.

8. In a heat exchange device, a casing having a cylindrical chamber through which an at-least-partially gaseous fluid to be cooled is adapted to flow, a cylindrical separator member arranged in said chamber and having formed on its exterior periphery curved flow directing passages whose direction has a maximum tangential component at their discharge ends, means for discharging liquid against an end surface of said cylindrical member to form a spray traversed by the fluid stream, the commingled fluid and liquid flowing through said curved passages and the latter imparting to the gaseous fluid and liquid a centrifugal whirling motion in a direction longitudinally of said chamber, and a deflecting surface against which the gaseous fluid and liquid impinge to effect final separation of the liquid from the cooled gaseous fluid.

9. In a heat exchange device, a casing having a cylindrical chamber through which an at-least-partially-gaseous fluid to be cooled is adapted to flow, a cylindrical separator member arranged in said chamber and having formed on its exterior periphery curved flow-directing passages, said passages having an increasingly circumferential direction as their discharge ends are approached, means for discharging liquid against an end surface of said cylindrical member to form a spray traversed by the fluid stream, the commingled fluid and liquid flowing through said curved passages and the latter imparting to the gaseous fluid and the liquid a centrifugal whirling motion in a direction longitudinally of said chamber.

10. In a heat exchange device, a casing having a cylindrical chamber through which an at-least-partially-gaseous fluid to be cooled is adapted to flow, a cylindrical separator member arranged in said chamber and having formed on its exterior periphery curved flow-directing passages, said passages having an increasingly circumferential direction as their discharge ends are approached, means for discharging liquid against an end surface of said cylindrical member to form a spray traversed by the fluid stream, the commingled fluid and liquid flowing through said curved passages and the latter imparting to the gaseous fluid and the liquid a centrifugal whirling motion in a direction longitudinally of said chamber, and means for regulating the liquid spray.

11. In a heat exchange device, a casing having a cylindrical chamber through which an at-least-partially gaseous fluid to be cooled is adapted to flow, a cylindrical separator member arranged in said chamber and having formed on its exterior periphery curved flow-directing passages, said passages having an increasingly circumferential direction as their discharge ends are approached, means for discharging liquid against an end surface of said cylindrical member to form a spray traversed by the fluid stream, the commingled fluid and liquid flowing through said curved passages and the latter imparting to the gaseous fluid and the liquid a centrifugal whirling motion in a direction longitudinally of said chamber, and a deflecting surface against which the gaseous fluid and liquid impinge to effect final separation of the liquid from the cooled gaseous fluid.

12. In a heat exchange device, a casing having a chamber substantially circular in cross section through which an at-least-partially-gaseous fluid to be cooled is adapted to flow, a cylindrical separator member arranged in said chamber adjacent one end thereof and provided on its exterior periphery with flow-directing passages arranged to provide a progressive rotation of material entering the same, means for discharging liquid against an end surface of the cylindrical member to form a spray to be traversed by the fluid stream, said casing beyond said cylindrical member having a smooth walled portion providing a race for material discharged from said passages and having a liquid discharge aperture therein, and means formed at the end of said chamber remote from said separator member providing a surface limiting liquid flow longitudinally of the chamber and maintaining any liquid therein at the periphery of said chamber and providing a discharge for gaseous fluid spaced inwardly from the inner periphery of the chamber.

13. In a heat exchange device, a casing having a chamber substantially circular in cross section through which an at-least-partially-gaseous fluid to be cooled is adapted to flow, a cylindrical separator member arranged in said chamber adjacent one end thereof and provided on its exterior periphery with flow-directing passages arranged to provide a progressive rotation of material entering the same, means for discharging liquid against an end surface of the cylindrical member to form a spray to be traversed by the fluid stream, said casing beyond said cylindrical member having a smooth walled portion providing a race for material discharged from said passages and having a liquid discharge aperture therein, and means formed at the end of said chamber remote from said separator member providing a surface limiting liquid flow longitudinally of the chamber and maintaining any liquid therein at the periphery of said chamber and providing an annular discharge for gaseous fluid spaced inwardly from the inner periphery of the chamber.

14. In a heat exchange device, a casing through which gaseous fluid to be cooled is adapted to flow, said casing having a cylindrical portion, means within said casing for effecting a direct intermingling of a cooling liquid with the gaseous fluid, means stationary with respect to the casing and arranged within said cylindrical casing portion and providing flow-directing surfaces cooperating to form a series of jets directed at their discharge into said casing portion helically of the latter for imparting a rapid centrifugal whirling motion to the commingled gaseous fluid and liquid completely about the interior periphery of said cylindrical casing portion in a direction longitudinally of the casing for effecting separation of the gaseous fluid and liquid, the interior periphery of said cylindrical casing portion providing a circular race for the whirling separated liquid, and means for respectively discharging the cooled gaseous fluid and separated liquid from the casing.

15. In a heat exchange device, a casing through which a gaseous fluid to be cooled is adapted to flow, said casing having a cylindrical portion, means within said casing for forming a liquid spray across the entrance to said casing in the path of the gaseous fluid stream, means within said cylindrical casing portion providing a plurality of spiral flow passages of small flow area and each extending longitudinally as well as circumferentially of said casing through which the commingled gaseous fluid and liquid flow, said spiral flow passages imparting a rapid whirling motion to the commingled gaseous fluid and liquid completely about the interior periphery of said cylindrical casing portion in a direction longitudinally of the casing for separating the cooled gaseous fluid and liquid, the interior periphery of said cylindrical casing portion providing a circular race for the whirling separated liquid into which the latter is discharged from said spiral flow passages, means for discharging the separated liquid from said casing, and discharge means from said casing for the cooled gaseous fluid in the same general line with the casing entrance.

16. In a heat exchange device, a casing through which a gaseous fluid to be cooled is adapted to flow, means in said casing for spraying a cooling liquid into the path of the gaseous fluid stream, means in said casing for thereafter separating the commingled liquid and gaseous fluid comprising a centrifugal motion creating means stationary with respect to said casing and forming passages discharging in a direction having an axial as well as a circumferential component relative to said casing whereby the commingled liquid and gaseous fluid during flow thereof therethrough are rapidly whirled about the interior of the casing in a direction longitudinally thereof to effect separation of the liquid from the cooled gaseous fluid, and means for discharging the separated liquid and the cooled gaseous fluid from said casing.

17. In a moisture separating and heat exchange device, a cylindrical casing through which the gaseous fluid to be treated is adapted to flow, means in said casing for spraying a cooling liquid radially of said casing into the path of the gaseous fluid stream, and means providing a plurality of similarly extending flow-directing surfaces each extending forwardly as well as circumferentially of said casing in said casing and stationary with respect thereto and beyond said spraying means for requiring all of the commingled gaseous fluid and liquid to traverse like spiral paths to impart a rapid whirling motion to the commingled gaseous fluid and liquid about the interior periphery of the casing in a direction longitudinally of the latter to effect separation of the liquid from the cooled gaseous fluid by centrifugal action.

18. In a moisture separating and heat exchange device, alined gaseous fluid supply and delivery passage forming means, and an intermediate cooling and separating means comprising a spray screen forming device for spraying a cooling liquid across the path of a gaseous fluid stream flowing through said passage forming means, a separating device comprising means forming a circularly arranged series of stationary spiral conduits each discharging in a zone transverse to said casing different from the zone in which its inlet lies, for imparting a rapid whirling motion to the commingled gaseous fluid and liquid in a longitudinal direction to effect separation of the liquid and gaseous fluid by the centrifugal action thereon, a circular discharge for the cleansed and cooled gaseous fluid disposed radially inwardly of the discharge zone of said conduits, and a liquid discharge means for the separated liquid spaced longitudinally of the discharge zone of said conduits.

WARREN NOBLE.

CERTIFICATE OF CORRECTION.

Patent No. 2,074,802.    March 23, 1937.

WARREN NOBLE.

It is hereby certified that error appears in the printed specification of the above numbered patent requiring correction as follows: Page 3, first column, line 59, claim 4, strike out the comma and words ", and means" and insert the same after "stream" in line 57, same claim; and second column, lines 26 and 42, claims 7 and 8 respectively, for "partially gaseous" read partially-gaseous; page 4, first column, line 17, claim 11, for "partially gaseous" read partially-gaseous; and second column, line 33, claim 15, after "which" insert passages; and that the said Letters Patent should be read with these corrections therein that the same may conform to the record of the case in the Patent Office.

Signed and sealed this 16th day of November, A. D. 1937.

(Seal)

Henry Van Arsdale,
Acting Commissioner of Patents.

for requiring all of the commingled gaseous fluid and liquid to traverse like spiral paths to impart a rapid whirling motion to the commingled gaseous fluid and liquid about the interior periphery of the casing in a direction longitudinally of the latter to effect separation of the liquid from the cooled gaseous fluid by centrifugal action.

18. In a moisture separating and heat exchange device, alined gaseous fluid supply and delivery passage forming means, and an intermediate cooling and separating means comprising a spray screen forming device for spraying a cooling liquid across the path of a gaseous fluid stream flowing through said passage forming means, a separating device comprising means forming a circularly arranged series of stationary spiral conduits each discharging in a zone transverse to said casing different from the zone in which its inlet lies, for imparting a rapid whirling motion to the commingled gaseous fluid and liquid in a longitudinal direction to effect separation of the liquid and gaseous fluid by the centrifugal action thereon, a circular discharge for the cleansed and cooled gaseous fluid disposed radially inwardly of the discharge zone of said conduits, and a liquid discharge means for the separated liquid spaced longitudinally of the discharge zone of said conduits.

WARREN NOBLE.

CERTIFICATE OF CORRECTION.

Patent No. 2,074,802.                                March 23, 1937.

WARREN NOBLE.

It is hereby certified that error appears in the printed specification of the above numbered patent requiring correction as follows: Page 3, first column, line 59, claim 4, strike out the comma and words ", and means" and insert the same after "stream" in line 57, same claim; and second column, lines 26 and 42, claims 7 and 8 respectively, for "partially gaseous" read partially-gaseous; page 4, first column, line 17, claim 11, for "partially gaseous" read partially-gaseous; and second column, line 33, claim 15, after "which" insert passages; and that the said Letters Patent should be read with these corrections therein that the same may conform to the record of the case in the Patent Office.

Signed and sealed this 16th day of November, A. D. 1937.

(Seal)

Henry Van Arsdale,
Acting Commissioner of Patents.

CERTIFICATE OF CORRECTION.

Patent No. 2,074,802.                                          March 23, 1937.

WARREN NOBLE.

It is hereby certified that error appears in the printed specification of the above numbered patent requiring correction as follows: Page 3, first column, line 59, claim 4, strike out the comma and words ", and means" and insert the same after "stream" in line 57, same claim; and second column, lines 26 and 42, claims 7 and 8 respectively, for "partially gaseous" read partially-gaseous; page 4, first column, line 17, claim 11, for "partially gaseous" read partially-gaseous; and second column, line 33, claim 15, after "which" insert passages; and that the said Letters Patent should be read with these corrections therein that the same may conform to the record of the case in the Patent Office.

Signed and sealed this 16th day of November, A. D. 1937.

(Seal)

Henry Van Arsdale,
Acting Commissioner of Patents.